Patented Nov. 29, 1949

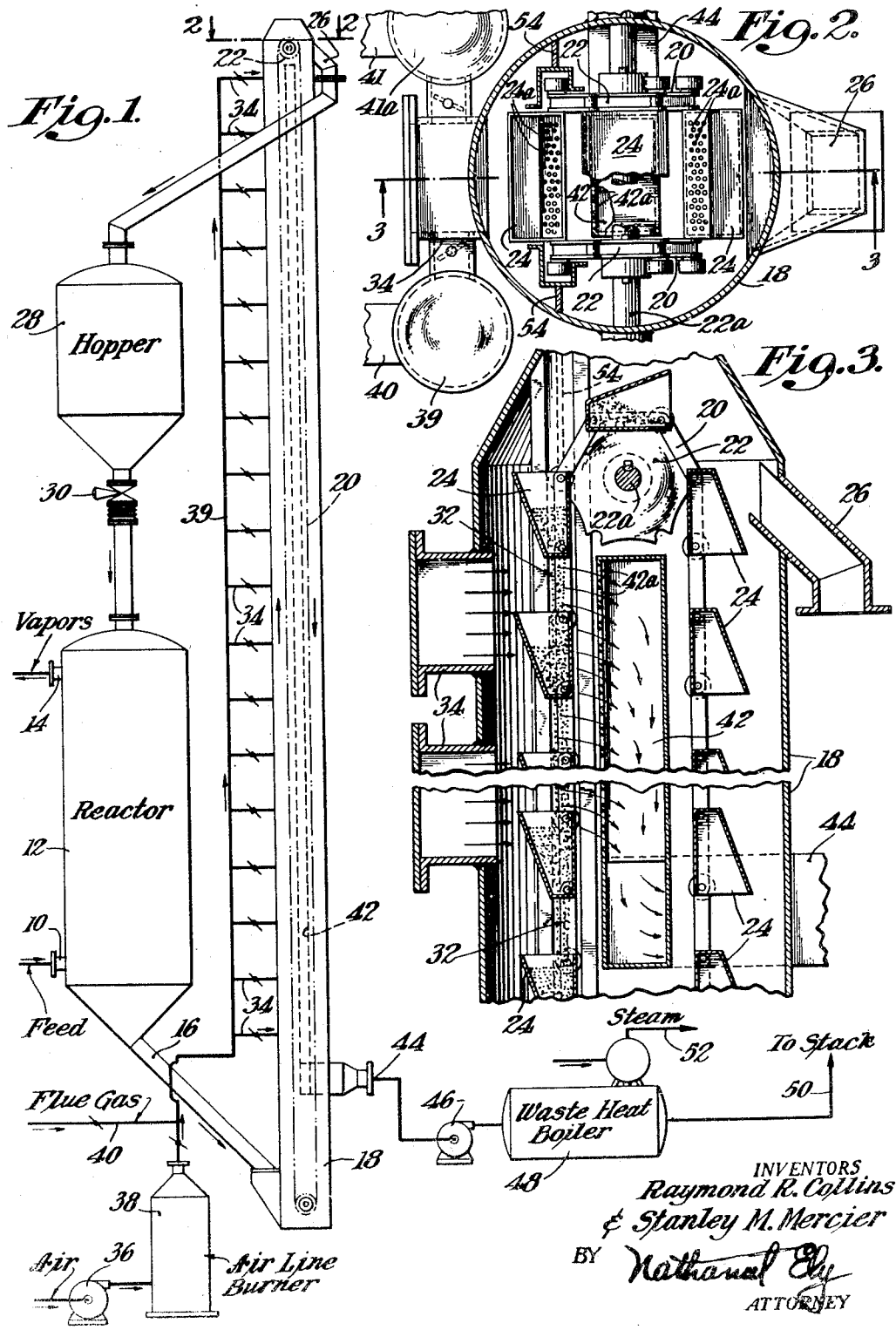

2,489,863

UNITED STATES PATENT OFFICE 2,489,863

PROCESS AND APPARATUS FOR REGENERATING CATALYST MATERIAL

Raymond R. Collins, Southport, Conn., and Stanley M. Mercier, Bexley, Ohio; said Collins assignor to The Lummus Company, New York, N. Y., a corporation of Delaware, and said Mercier assignor to The Jeffrey Manufacturing Company, a corporation of Ohio Application June 6, 1946, Serial No. 674,756

6 Claims. (Cl. 196—52)

This invention relates to improvements in methods and apparatus for contacting granular material with vapors or gases to remove certain particles or elements therefrom and in a specific embodiment, relates to the regeneration of spent catalyst. Another specific embodiment thereof is the removal of water or moisture from granular material.

As is well known, in many chemical and petroleum operations, the catalyst used is subject to slow deterioration due to deposit of certain contaminants such as carbon in petroleum conversion. Heretofore it has been necessary to treat such spent catalyst to remove the contaminants and such regeneration is a delay in the conversion process, expensive to accomplish and difficult to control.

A general object of the invention is to simultaneously elevate and partially drop a granular material in such a manner as to provide short free falling curtains of material and to contact such curtains of material with a gas or vapor to bring about a desired reaction, cleaning, drying or other effect so that a net reacted cleaned or dried material may be constantly removed overhead.

It is one specific object of this invention to improve the regeneration or reactivation of spent catalyst.

A further object of our invention is to provide an improved means and method for continuously oxidizing the carbonaceous deposit on a spent catalyst without requiring complicated large size apparatus, and to accomplish such regeneration in the elevator which returns the catalyst to the point of feed.

Another specific object of this invention is to provide an improved method and means for drying granular materials.

Further objects of our invention will appear from the following description of a preferred form of embodiment, taken in connection with the attached drawing illustrative thereof, and in which:

Fig. 1 is an elevation diagrammatically showing the general arrangements of apparatus.

Fig. 2 is a horizontal cross section on the line 2—2 of Fig. 1.

Fig. 3 is an enlarged vertical cross section taken substantially on the line 3—3 of Fig. 2.

In accordance with our invention, as applied to a catalytic hydrocarbon conversion process a charge of hydrocarbon at 10 is introduced to a reactor 12 through which a catalyst of the usual granular, pelleted, or spherical type is continuously passed. The reacted vapors may be removed at 14 or at any other desired place as is well known in the art.

The catalyst becomes contaminated by the reaction, and with the hydrocarbon feed, a carbonaceous deposit results. This materially reduces the activity of the catalyst and must therefore be removed before the catalyst is again useful. This spent catalyst is removed at 16 and is conducted to an elevator 18 which may be of the bucket type.

In the prior constructions, the catalyst was elevated to the top of a suitable chamber through which it passed and was regenerated by blowing with an oxygen containing gas in the case of carbon contamination. The catalyst was then available for elevation to the top of the reactor and thence returned to circulation.

In accordance with out invention, this regeneration is accomplished in the elevator itself and during the elevation. For such purpose certain changes are made to the elevator heretofore employed, as hereinafter described.

As more particularly shown in Fig. 3 the elevator 18 contains a typical chain conveyor 20 carried by sprockets 22 mounted on a driven shaft 22a and buckets 24 are attached to the chain in any desirable manner. Although the details of the drive are not shown, means are provided to drive the chain as by positively driving the shaft 22a.

With the movement of catalyst from reactor 12 to the bottom of elevator 18, there is a continuous body of material for the buckets 24 to engage and this is carried to the top of the elevator, where the catalyst will be discharged to the outlet conduit 26. This conduit communicates with a reserve hopper 28, and the catalyst discharges from hopper 28, through valve 30 to the top of reactor 12.

To best accomplish regeneration within the elevator 18, thus eliminating other chambers or kilns and further equipment, we arrange each bucket with a perforated or partially open bottom or lower wall 24a to provide a continuous leak or slippage of material. This forms a continuous free falling shower of contact material generally indicated at 32 and extending between batches of material carried by substantially all buckets of the working run from top to bottom of the elevator.

This curtain or shower 32 of catalyst is relatively shallow and as wide as the bucket giving a large surface area. A regenerating or conditioning gas or fluid is then passed through the shower or curtain by introducing the regenerating gas or fluid to the elevator through various nozzles or inlets generally indicated at 34. If the contaminant is carbon, air is a suitable regenerating gas and in such case it is pumped by blower 36 through air line burner 38 for heating and thence to the riser 39 for distribution to the various inlet points. Flue gas may be introduced at 40 for dilution and temperature control or supplemental cold air from duct 41 may enter riser 41a and be similarly distributed to inlets 34. This will provide a flexible temperature control effective to vary temperatures throughout the elevator or at any desired part of the elevator.

We also provide a central duct 42 in casing 18 which is suitably apertured, at 42a, to receive the products of combustion or contaminated or spent gas and this duct is conveniently connected through conduit 44 and blower 46 with waste heat boiler 48. The cooled gas goes to the stack by line 50 and the beneficial heat may be removed as steam in line 52.

As shown in Fig. 2, it may be desirable to baffle the elevator chain and guide the buckets as by baffle member 54. This will assure the proper movement of the gas through the curtain of granular material and thence to the duct 42. It is of course understood that structural details for this purpose may be changed as desired.

It will be apparent that by arranging the bucket openings 42a and the rate of movement of the buckets, that we can obtain any desired residence time of catalyst in the elevator-regenerator. It will also be apparent that the catalyst is repeatedly rehandled in that it passes through at least one bucket and is thus prevented from being overheated or from being underheated. The rate of elevation preferably permits movement of catalyst through at least two buckets. Completely uniform air distribution and burning can thus be accomplished.

Our invention has other applications than regenerating catalyst. As an example, it is possible to elevate any granular material and dry such material by the introduction of a heating gas. This would accomplish a simultaneous movement (which might be entirely in elevation or partly linear) and drying.

It is also possible to accomplish other gas contacting other than oxydation. Various chemical reactions such as chlorination, sulphonation, etc. might be effectively accomplished. Desulphurization could also be accomplished by the use of suitable gas.

Details of control are only generally illustrated as dampers, etc., it being understood that suitable temperature, pressure, time and level controls would be used as understood in the art. It is also to be understood that corrosion resistant materials will be used where necessary and for high temperature operation alloys of appropriate tensile strength must be utilized.

Other changes and modifications may also be made within the scope and spirit of our invention.

We claim:

1. The method of simultaneously elevating and gas contacting a granular mass which comprises continuously and separately elevating small portions of the granular mass in a common vertical path, releasing a portion only of the mass from each small portion for free fall to the next subjacent small portion, the ratio of falling material at the rate of elevation being such that there is a continuous net elevation of the granular mass, forming curtains of the falling material between the successive ascending portions of the mass from top to bottom of the path, and passing a gas through said curtains.

2. In the method of continuously converting hydrocarbons with a moving bed of catalyst under conversion conditions of time and temperature in a reaction zone and thereafter continuously removing carbon contamination from the catalyst with a reheating of the catalyst in a regeneration zone and return of the reheated catalyst to the reaction zone, the improvement which comprises elevating the catalyst through the regeneration zone in a series of small masses, continuously releasing from each mass a portion of the contaminated catalyst, continuously intercepting the fall of the portion at rising horizontal levels, continuously elevating the intercepted portion as well as the unreleased portion of the contaminated catalyst to accomplish a net elevation of the catalyst, the released catalyst forming curtains between the successive ascending small masses, and passing a regenerating gas into contact with the curtains of catalyst to accomplish regeneration.

3. A gas-and-solid contact apparatus, including a gas-tight casing defining a contact chamber, an endless conveyor within said chamber including buckets for granular contact material connected in series and spaced a substantial distance apart, means training said conveyor to form same with a vertical reach, and for driving the conveyor to move said buckets upwardly, each bucket being open at the top and having a bottom area only thereof apertured for leakage of said material and smaller than and directly underlying the open top of the bucket, to discharge a substantial portion of the material from each ascending bucket into an immediately following bucket and thereby form curtains of the material between successive buckets along said reach, and means defining gas inlet and outlet passages for the chamber arranged to pass gas through said curtains.

4. The apparatus claimed in claim 3 wherein the said gas passages are located at opposite sides of said reach of the conveyor and the means defining one of said passages comprises a gas conduit extending along said reach and open laterally therealong toward said reach.

5. A contaminated catalyst regenerator and elevator for carrying and decontaminating catalysts from the lower part of a catalyst reaction chamber to a point substantially above the reaction chamber from which the decontaminated catalyst can fall by gravity into the reaction chamber which comprises a casing defining a vertical closed chamber, an endless elevator member within said chamber and including a series of buckets spaced a substantial distance apart, means to move said elevator member to advance the buckets continuously upward in carrying position, each of said buckets being open at the top and having a bottom area only thereof apertured for leakage of catalyst and smaller than and directly underlying the open top of the bucket, to discharge a portion of the catalyst from each ascending bucket into an immediately following bucket and thereby form curtains of the catalyst between successive buckets, means to pass a gas of controlled oxygen content through said curtains to remove the carbon deposit from the falling catalyst particles, and means to remove the products of combustion from the chamber.

6. A contaminated catalyst regenerator and elevator as claimed in claim 5 wherein the means for passing such gas through said curtains includes means defining a passage for introduction of the gas to the chamber and means defining a passage for conducting the products of combustion from the chamber, one of said passage-defining means comprising a conduit extending along the path of the ascending buckets and open therealong laterally toward said path.

RAYMOND R. COLLINS.
STANLEY M. MERCIER.

REFERENCES CITED

The following references are of record in the file of this patent:

UNITED STATES PATENTS

| Number | Name | Date |
| --- | --- | --- |
| 339,874 | Gathmann | Apr. 13, 1886 |
| 1,184,397 | Weinrich | May 23, 1916 |
| 1,489,846 | O'Connell et al. | Apr. 8, 1924 |
| 2,187,799 | Baughman | Jan. 23, 1940 |
| 2,323,920 | Knudson | July 13, 1943 |
| 2,370,950 | Gibb et al | Mar. 6, 1945 |
| 2,377,512 | Page | June 5, 1945 |
| 2,379,408 | Arveson | July 3, 1945 |
| 2,387,798 | Kubicek et al. | Oct. 30, 1945 |
| 2,423,813 | Lechthaler et al. | July 8, 1947 |